United States Patent
Inatomi et al.

[11] 3,897,661
[45] Aug. 5, 1975

[54] GEAR-TOOTH GRINDING METHOD AND MACHINE THEREFOR

[75] Inventors: Isamu Inatomi; Hisasi Okuwa, both of Koga-machi, Japan

[73] Assignee: Seibu Denki Kogyo Kabushi Kaisha, Koga-machi, Japan

[22] Filed: Dec. 20, 1974

[21] Appl. No.: 535,131

Related U.S. Application Data

[63] Continuation-in-part of Ser. No. 326,120, Jan. 23, 1973, abandoned.

[30] Foreign Application Priority Data
Feb. 23, 1972 Japan.............................. 47-18803
Apr. 24, 1972 Japan.............................. 47-40340

[52] U.S. Cl............. 51/287; 51/52 HB; 51/105 HB
[51] Int. Cl.² ... B24B 1/00; B24B 5/00; B24B 17/00
[58] Field of Search...... 51/45, 52 HB, 105 HB, 287

[56] References Cited
UNITED STATES PATENTS

| | | | |
|---|---|---|---|
| 1,693,781 | 12/1928 | Hanson | 51/45 |
| 1,708,570 | 4/1929 | Hanson | 51/105 HB |
| 2,385,650 | 9/1945 | Rickenmann | 51/52 HB |
| 2,642,703 | 6/1953 | Staples | 51/52 HB |
| 3,708,925 | 11/1973 | Ainoura | 51/287 |

*Primary Examiner*—Othell M. Simpson
*Attorney, Agent, or Firm*—Browdy and Neimark

[57] ABSTRACT

A method of grinding work gears comprising reciprocating the work gear by a substantial tooth breadth of the work gear relative to an abrasive grinding worm more than one time during one rotation of the work gear. Additionally, a ratio of the reciprocating speed of the work gear to the rotational peripheral speed of the pitch circle of the work gear is set within a range of about 0.26 to 4. The work gear is caused to reciprocate relative to the abrasive grinding worm at a substantially constant speed continuously and relatively, thereby grinding the tooth surface of the work gear in a crosshatched pattern.

1 Claim, 6 Drawing Figures

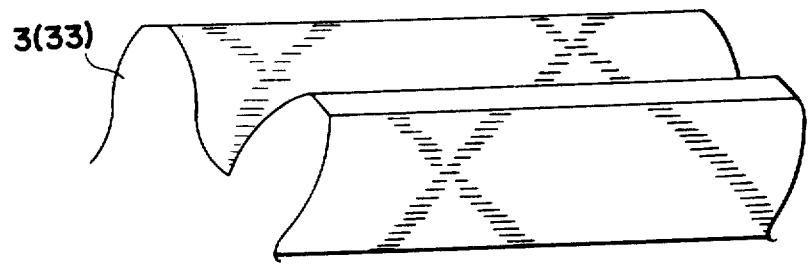
FIG. 5
FIG. 3   FIG. 4   FIG. 6
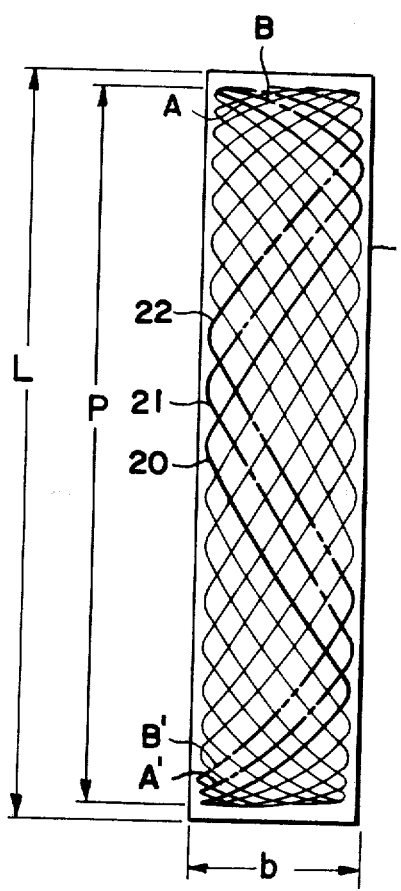
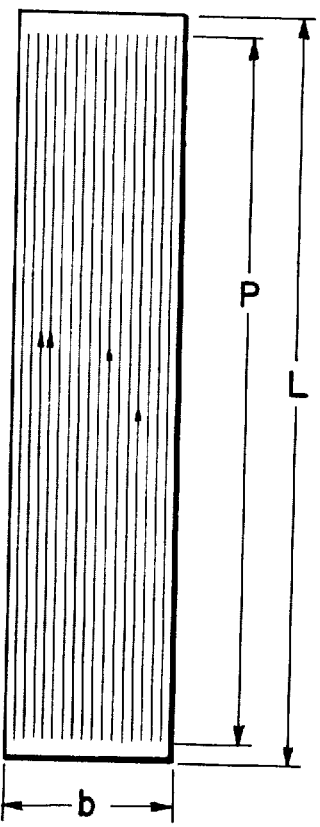
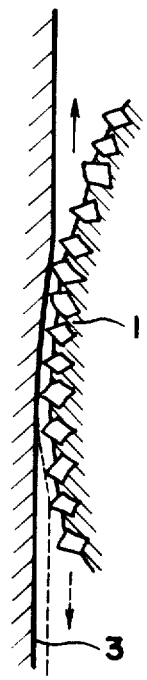

GEAR-TOOTH GRINDING METHOD AND MACHINE THEREFOR

This application is a continuation-in-part of application Ser. No. 326,120 filed Jan. 23, 1973, now abandoned.

BACKGROUND OF THE INVENTION

The present invention relates to a gear-tooth grinding method and a machine therefor.

In general after cutting and surface hardening, gears must be finished by lapping, honing or grinding in order to remove small errors of distortion and scale resulting from the surface hardening operation which is effected in order to make the tooth surfaces to withstand sufficiently against a high rotational speed and a heavy load.

However, in gear-tooth lapping or honing, the quantity of material removed from a work gear is very limited, and gears cannot be finished to the close tolerances demanded unless they are initially cut, generated or shaved with a higher degree of accuracy. Gear-tooth grinding can readily remove larger amounts of material than lapping and honing, but grinding efficiency is not satisfactory because of the rigidness, wear, deformation and so on of a grinding wheel. Therefore, in order to finish gears with a higher degree of accuracy at less cost, gears which are to be subjected to a heat treatment must have as little error in tooth profile as possible, and the possible errors of distortion caused by a heat treatment operation must be minimized. Therefore, gear cutting machines or gear shaping machines which are capable of cutting and shaving gears with a higher degree of accuracy are required, and in order to minimize the possible errors of distortion caused by a heat treatment operation, expensive apparatus and very accurately controlled heat treatment operations are required.

In order to improve the gear cutting efficiency, ultra-high speed gear hobbing machines using ultra-hard hobs or hobs with a plurality of threads, and other gear generating machines are widely used. However, gears cut or generated by these machines must be finished more or less by gear lapping or grinding but no satisfactory result can be obtained when they are finished directly by lapping or grinding. Even though the advantages of the surface hardening of gears are well known, only high-grade gears are surface hardened because of the high cost.

A gear finishing method has been disclosed in Japanese Patent Publication No. 29,719/1971, in which a work gear which is rotatably supported is made in mesh with a worm-shaped hone which contains abrasive materials and has some elasticity, and the worm-shaped hone traverses from one end to the other end of the side of a tooth of the work gear along a straight path. Since the worm-shaped bone is traversed in the manner described, the grinding path is similar to that of the gear hobbing so that the gears are finished only with an accuracy similar to that attained in gear hobbing. Furthermore, the worm-shaped hone comes into contact with a larger area of the tooth surface of a work gear so that loading of the worm-shaped hone tends to occur very often and the grinding efficiency is poor.

Since the worm-shaped hone is elastic, it tends to be deformed due to the pressure of contact so that the contact area is further increased. Furthermore, the worm-shaped hone traverses from one end to the other end of the side of a tooth at a constant slow speed so that the thickness of a tooth remains unchanged at the center and at the ends. Therefore, the end bearing arises because of the misalignment of the gear axes so that a noise is produced and irregular wearing of the tooth surface are caused.

BRIEF SUMMARY OF THE INVENTION

One of the objects of the present invention is therefore to provide an improved method and machine for finishing surface hardened gears to the extremely close dimensional tolerance required in a simple manner at a less cost.

Another object of the present invention is to provide a method and machine for finishing surface-hardened gears which overcome the above and other problems encountered in the conventional gear finishing methods.

Briefly stated, according to the present invention, a work gear which is rotatably supported is made to mesh with an abrasive grinding worm, and the optimum torque is imparted to the work gear in the direction of rotation thereof or in the direction retarding the rotation so as to produce a required contact pressure between the tooth surface and the abrasive grinding worm. Either the work gear or grinding worm, generally the former, is reciprocated relative to the other while the grinding worm is rotated.

The work gear is reciprocated by a substantial tooth breadth of the work gear relative to the abrasive grinding worm more than one time during one rotation of the work gear. Additionally, the ratio of the reciprocating speed of the work gear to the rotational peripheral speed of the pitch circle of the work gear is set within a range of about 0.26 to 4. The work gear is caused to reciprocate relative to the abrasive grinding worm at a substantially constant speed continuously and relatively, thereby a grinding path is produced in a direction oblique to the tooth thread on the tooth surface of the work gear, and said work gear is reciprocated a number of times so that the tooth surface of the work gear is ground in crosshatched patterns and finally into the smooth surface. Furthermore, the stroke of the relative reciprocation between the work gear and the abrasive grinding worm is made equal to or slightly less than the width of the tooth of the work gear so that a larger quantity of material may be removed at the ends of a tooth than at the center thereof.

The above and other objects, features and advantages of the present invention will become more apparent from the following description of some preferred embodiments thereof taken in conjunction with the accompanying drawing.

BRIEF DESCRIPTION OF THE DRAWING

FIG. 3 is a view which shows the grinding paths according to the present invention, viewed from one side of the cross hatched grinding path on the pitch circle cylinder of the work gear;

FIG. 4 is a view similar to FIG. 3, but showing the grinding paths formed by the conventional gear finishing machines;

FIG. 5 is a fragmentary perspective view, on an enlarged scale, of a work gear illustrating the grinding paths formed upon the tooth surfaces thereof; and FIG. 6 is a view which shows the gear grinding operation in accordance with the present invention.

DESCRIPTION OF THE PREFERRED EMBODIMENTS

Figure 1:
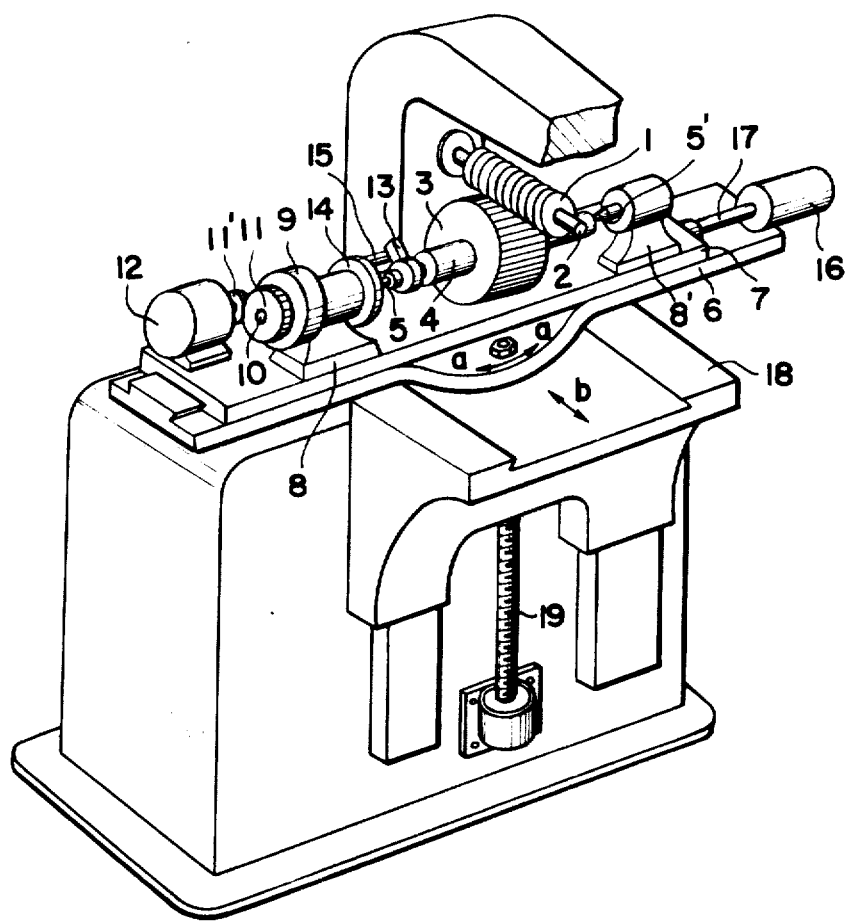
FIGS. 1 and 2 are perspective views of a first and second embodiment of the present invention.

First Embodiment, FIG. 1

An abrasive grinding worm 1 mounted on a spindle 2 which in turn is drivingly coupled to a motor (not shown) is rotated at high speed in mesh with a work gear 3 mounted on an arbor which in turn is rotatably supported by a pair of centers 5 and 5'. The centers 5 and 5' are supported on supporting members 8 and 8' securely fixed to a slide 7 which is slidable on a bed 6. A disk 14 having a projection 15 in engagement with a torque arm 13 radially outwardly extending from the arbor 4 is mounted on the inner end of a spindle extending through one supporting member 8. The spindle is drivingly coupled to a motor 12 through a torque converter 9, which is adapted to transmit only a torque of a predetermined magnitude through its shaft 10 and gears 11 and 11'. Therefore, the work gear 3 in mesh with the grinding worm 1 is imparted with a driving or positive torque which is suitable selected by the combination of the motor 12 and the torque converter 9 (the retarding torque being produced when the motor 12 is rotated in the direction opposite that of the grinding worm 1). Therefore, the grinding worm 1 in mesh with the work gear 3 grinds the work gear 3 with a predetermined contact pressure because it restrains the rotation of the work gear 3.

The slider 7 which is coupled to a piston rod 17 of a hydraulic cylinder 16 (which may be replaced by any suitable reciprocating device such as a crank) is reciprocated and is swiveled in the direction indicated by a double-pointed arrow a so that work gear 3 can be made to correctly mesh with the grinding worm 1. Furthermore, the slider 7 is slidable transversely in the direction indicated by a double-pointed arrow b and is also movable vertically by means of a threaded screw 19.

In order to grind the helical gears, it is necessary to mount a rotary bed upon the slider 7 and to dispose the supporting members 8 and 8' and the motor 12 so that a helical gear may be in mesh with the grinding worm and the helix angle coincides with the direction of reciprocation of the slider.

As a torque converter 9, a brake sold under the trademark "Powder Clutch Brake" may be used in order to transmit a predetermined torque so as to permit the work gear 3 to mesh with the grinding worm 1 under a constant pressure of contact. Assuming that the grinding wheel rotates at 1,600 rpm and the number of teeth of the work gear 3 is 40, then the input shaft of the Powder Clutch Brake must be rotated at a rotational speed higher than 1,600/40 rpm.

Next, the grinding path will be described. The work gear 3 is rotated as well as reciprocated in the direction of its axis. During one rotation of the work gear 3, the work gear 3 is caused to reciprocate by a substantial tooth breadth of the work gear more than one time during each reciprocation. The ratio of the reciprocating speed of the work gear 3 to the rotational peripheral speed of the pitch circle of the work gear is set within a range of about 0.26 to 4 (the value being determined necessarily from the crosshatched pattern and its effect as a desired range). The work gear 3 is caused to reciprocate relative to the abrasive grinding worm 1 at a constant speed continuously and relatively. As a consequence, the grinding path makes an angle relative to the side of the tooth as shown in FIG. 5. When the reciprocating grinding operation is continued, the crosshatched or diamond-shaped cut marks are left on the tooth surface as shown in FIG. 3 and as will be described in more detail hereafter. The unground portion surrounded by the grinding paths is in the form of a pyramid, and is gradually reduced in size and finally diminished so that the tooth surface is very smoothly ground.

As described hereinabove, the abrasive grinding worm and the work gear are in mesh with each other and are reciprocated with respect to each other so that the grinding paths may become or form the crosshatched or diamond-shaped pattern upon the tooth surface. Therefore, loading of the grinding worm may be prevented and the better grindability may be maintained over a long time.

As shown in FIG. 6, each of abrasive grains on the abrasive grinding worm grinds one tooth surface (indicated by the solid line) in the going stroke and then grinds the other tooth surface (indicated by the broken line) in the return stroke so that loading and wear of the abrasive grinding worm may be positively prevented. Furthermore, the above described crosshatching grinding method is employed. Thus, the work gear may be finished with a higher degree of accuracy without causing any grinding crack at a low cost and in a very efficient manner.

In the reciprocation of the work gear 1, the tooth surface is made to move faster at the center therof relative to the grinding wheel than at the ends thereof so that the tooth surface is ground more at the ends thereof, that is at the ends of the stroke of reciprocating motion, than at the center. That is, the teeth of the work gear 1 are crowned so that the finished gears may mesh very smoothly without causing the noise and abrasion and wear.

Figure 2:
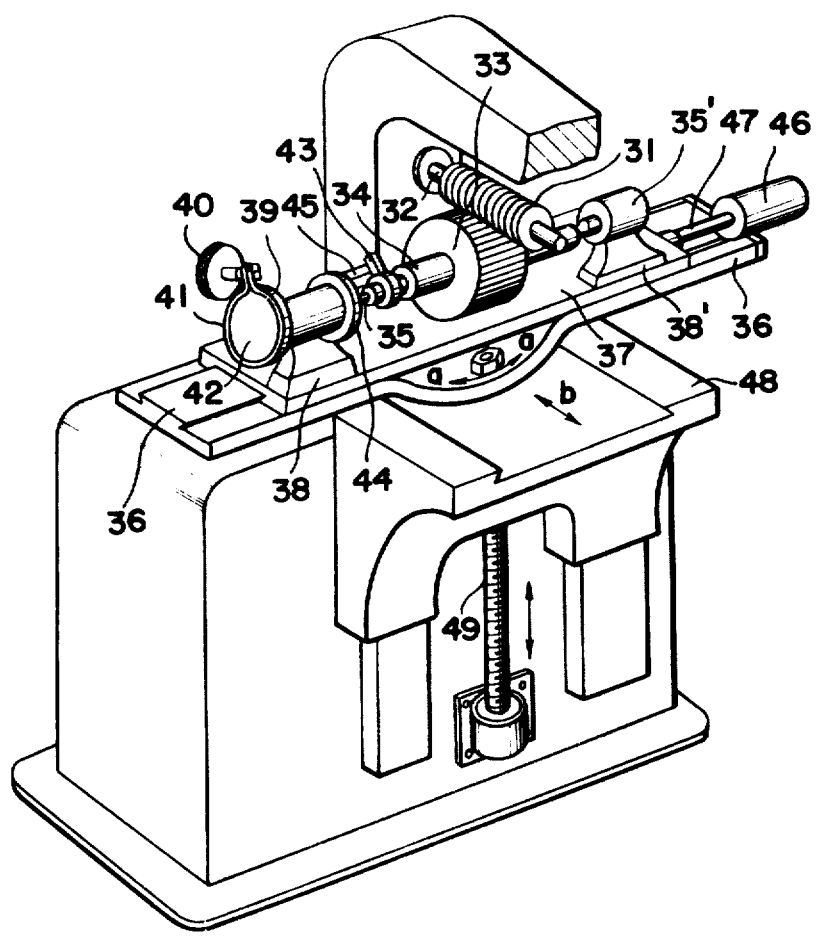

Second Embodiment, FIGS. 2, 3 and 5

Next, referring to FIG. 2, the second embodiment of a gear-tooth grinding machine in accordance with the present invention will be deacribed. As with the first embodiment described above, an abrasive grinding worm 31 is mounted on a spindle 32 and is rotated at high speed by a motor (not shown). A work gear 33 in mesh with the grinding worm 31 is mounted on an arbor 34 which in turn is rotatably supported by a pair of centers 35 and 35'. The centers 35 and 35' in turn are supported on supporting members 38 and 38' which in turn are securely fixed on a slider 37 which is slidable over a bed 36. A band brake 39 is fitted over the outer end of a rotary shaft extending through one supporting member 38 and is fixed to the slider 37 so as not to be rotated in unison with the rotary shaft. The retarding force to be applied to the rotary shaft from the band brake 39 comprising an adjustable wheel 40 and a band 41 may be suitably adjusted by rotating the adjusting wheel 40.

A torque arm 43 extending radially outwardly from the arbor 34 is in engagement with the projection 45 extending from a disk 44 attached to the inner end of the rotary shaft so that the work gear 33 is mesh with the grinding worm 31 is imparted with the retarding force from the band brake 39 when it rotates in unison with the grinding wheel 31. The pressure of contact or grinding pressure may be suitably adjusted by adjusting the retarding force applied by the hand brake 39.

The slider 37 is connected to a piston rod 47 of a hydraulic cylinder 46 for reciprocal motion. (Any suitable reciprocating device may be used instead of the hydraulic cylinder 40). The slider 37 may be swiveled in the direction indicated by the double-pointed arrow *a* so that the work gear 33 may be brought into correct mesh with the grinding worm 31. Furthermore, the slider 37 may be traversed in the direction indicated by the double-pointed arrow *b* and may be also movable vertically by means of a threaded rod 49.

Assuming that the worm-like grinding wheel 31 rotates at 1,640 rpm in grinding a work gear with 40 teeth, and an outer diameter of 126 mm, a pitch circle of 120 mm, a width of tooth of 28 mm and a module 3, then the work gear is rotated at 41 rpm. The slider 47 is reciprocated by the hydraulic cylinder 46 at a rate of 170 times a minute with an amplitude or stroke of 26 mm. Therefore, the grinding path makes an angle relative to the axis of the tooth as shown in FIG. 5.

FIG. 3 shows the grinding paths on the pitch circle cylinder of the work gear. It is seen that the grinding paths leave the cut marks in the crosshatched or diamond-shaped form as the work gear is rotated many times. This illustrates a view looking at the gear from one side, and in the drawing L is the outside diameter of the work gear, P is the diameter of pitch circle of the work gear and b is the breadth of the work gear. More particularly, the solid curved line 20 in FIG. 3 shows the first grinding path or cut mark left when the work gear makes the first rotation. The end A of the grinding path 20, after affecting a further half rotation, is continuous with the starting point A' of the grinding path indicated by the chain line 21 of the second roatation of the work gear. The end B of the second grinding path 21, after effecting a further half rotation, is continuous with the starting point B' of the third grinding path 22 indicated by the two-dot chain line. In general, the end point of the *n*-th grinding path is continuous with the starting point of the (*n*+1)-th grinding path. Thus, the grinding paths leave the crosshatched cut marks on the tooth surface. The unground portion which is surrounded by the grinding paths and is generally in the form of a pyramid is ground and reduced gradually so that the tooth surface may be finally very smoothly finished with a higher degree of accuracy. It is very important that the grinding paths form the crosshatched or diamond-shaped pattern upon the tooth surface and that the unground portions in the form of a pyramid surrounded by the grinding paths are gradually ground, reduced in size and diminished. Thus, loading of the grinding wheel may be positively prevented and overheating of a localized area of the work gear may be also prevented so that the grinding cracks may be prevented.

The work gear may be reciprocated with respect to the abrasive grinding worm by a crank, or a hydraulic or pneumatic cylinder. The reciprocation of the work gear is so controlled that the reciprocating velocity of the work gear is considerably slower at the ends of the stroke with respect to the grinding worm than at the center while the grinding worm is rotated at a constant speed. Therefore, the ends of the tooth surface are ground more than the center so that the tooth is crowned so as to ensure the quiet and smooth performance.

Each of the abrasive grains of the grinding wheel is accelerated or decelerated depending upon the difference between the rotational speed of the grinding wheel and the reciprocating speed of the work gear. Furthermore, each of the abrasive grains grinds by its different surfaces or cutting edges the work gear. Therefore, loading and excessive wear of the grinding wheel may be prevented.

Whereas the conventional gear-tooth grinding machines grind the tooth surfaces along the paths in parallel with the axis of the tooth, the gear-tooth grinding machine in accordance with the present invention grinds the tooth surface at an angle relative to the axis thereof so that the grinding paths may leave the crosshatched cut marks pattern on the tooth surface. Therefore, the unground spots surrounded by the grinding paths become substantially in the form of a pyramid so that the grinding may be effected intermittently. Therefore, loading of the grinding wheel may be prevented and the better grindability may be maintained. Furthermore, excess heating of a localized spot on the tooth surface by grinding may be prevented so that the grinding cracks may be obviated.

In the reciprocation stroke of the work gear, a larger quantity of material is removed from the tooth surface at each end thereof than at the center to provide crowned teeth so that the quiet and smooth performance of the finished gears may be ensured and the noise and the excessive wear of gears may be prevented.

It will be obvious to those skilled in the art that various changes may be made without departing from the scope of the invention and the invention is not to be considered limited to what is shown in the drawings and described in the specification.

What is claimed:

1. A method of grinding work gears comprising the steps of:

bringing the screw thread of an abrasive grinding worm into direct mesh with a rotatably supported work gear;

setting a ratio of the reciprocating speed of said work gear to the rotational peripheral speed of the pitch circle of said work gear within the range of about 0.26 to 4;

exerting a torque required for grinding to said work gear;

rotating said abrasive grinding worm; and reciprocating said work gear relative to said abrasive grinding worm by a substantial breadth of said work gear relatively and continuously so that more than one reciprocation of said work gear relative to said worm gear is completed during one rotation of said work gear wherein a grinding path is produced on the tooth surface of the work gear in a direction oblique to the tooth thread of the work gear, and reciprocating the work gear relative to the abrasive grinding worm at a substantially constant speed continuously and relatively a number of times so that the tooth surface of the work gear is ground in a crosshatched pattern and finally into a smooth surface.

* * * * *